US012729958B2

(12) United States Patent
Johansson et al.

(10) Patent No.: US 12,729,958 B2
(45) Date of Patent: Sep. 8, 2026

(54) METHOD AND A SYSTEM FOR DETERMINING WHEEL ALIGNMENT PARAMETER OF A VEHICLE

(71) Applicant: Car-O-Liner Group AB, Västra Frölunda (SE)

(72) Inventors: Andreas Johansson, Kvicksund (SE); Oscar Krantz, Katrineholm (SE); Max Mårtensson, Katrineholm (SE)

(73) Assignee: Car-O-Liner Group AB, Västra Frölunda (SE)

( * ) Notice: Subject to any disclaimer, the term of this patent is extended or adjusted under 35 U.S.C. 154(b) by 1401 days.

(21) Appl. No.: 17/436,286

(22) PCT Filed: Mar. 2, 2020

(86) PCT No.: PCT/SE2020/050233
§ 371 (c)(1),
(2) Date: Sep. 3, 2021

(87) PCT Pub. No.: WO2020/185144
PCT Pub. Date: Sep. 17, 2020

(65) Prior Publication Data
US 2022/0178683 A1 Jun. 9, 2022

(30) Foreign Application Priority Data
Mar. 8, 2019 (SE) .................................... 1950300-2

(51) Int. Cl.
*G01B 11/26* (2006.01)
*G01B 11/275* (2006.01)

(52) U.S. Cl.
CPC .... *G01B 11/2755* (2013.01); *G01B 2210/143* (2013.01); *G01B 2210/24* (2013.01); *G01B 2210/303* (2013.01)

(58) Field of Classification Search
CPC .......... G01B 11/2755; G01B 2210/143; G01B 2210/24; G01B 2210/303; G01B 11/275; G01B 7/315; G01B 21/26; B21D 1/14
See application file for complete search history.

(56) References Cited

U.S. PATENT DOCUMENTS

| | | | | |
|---|---|---|---|---|
| 7,324,916 | B1 | 1/2008 | Phillips, III | |
| 2008/0119978 | A1 * | 5/2008 | Stieff | G01B 11/2755 701/31.4 |

(Continued)

FOREIGN PATENT DOCUMENTS

| | | | |
|---|---|---|---|
| EP | 0769675 | A2 | 4/1997 |
| WO | 9405969 | A1 | 3/1994 |

(Continued)

OTHER PUBLICATIONS

Jerew, Benjamin. "Know your car parts: what is a car chassis and what does it do?". NAPA Blog, Mar. 9, 2017. https://knowhow.napaonline.com/know-your-car-parts-what-is-a-car-chassis-and-what-does-it-do/ (Year: 2017).*

(Continued)

*Primary Examiner* — Samantha K Nickerson
(74) *Attorney, Agent, or Firm* — RMCK Law Group, PLC

(57) ABSTRACT

The present disclosure relates to a method determining wheel alignment parameter of a vehicle comprising a vehicle body. In particular, the method is performed by attaching a measuring arrangement to positions at a first and second longitudinally extending side portions of the vehicle body, respectively. A first and a second lateral center position are determined whereby a wheel alignment parameter in the form of a longitudinally extending centerline of the vehicle is determined.

12 Claims, 4 Drawing Sheets

(56) References Cited

U.S. PATENT DOCUMENTS

2012/0320370 A1 12/2012 Giacomini et al.
2013/0110314 A1* 5/2013 Stieff .................. G01B 11/275 701/1
2014/0253909 A1 9/2014 McClenahan et al.
2015/0040410 A1 2/2015 Hwang

FOREIGN PATENT DOCUMENTS

WO 9828595 A1 7/1998
WO 2004023065 A2 3/2004
WO 2006027329 A1 3/2006

OTHER PUBLICATIONS

PCT International Search Report and Written Opinion dated Mar. 11, 2020 for International Application No. PCT/SE2020/050233, 9 pages.
Swedish Search Report dated Aug. 8, 2019 for Swedish Patent Application No. 1950300-2, 3 pages.

* cited by examiner

METHOD AND A SYSTEM FOR DETERMINING WHEEL ALIGNMENT PARAMETER OF A VEHICLE

CROSS-REFERENCE TO RELATED APPLICATIONS

This application is a 371 U.S. National Stage of International Application No. PCT/SE2020/050233, filed Mar. 2, 2020, which claims priority to Swedish Patent Application No. 1950300-2, filed Mar. 8, 2019. The disclosures of each of the above applications are incorporated herein by reference in their entirety.

TECHNICAL FIELD

The present disclosure relates to a method for determining wheel alignment parameter of a vehicle. In particular, the present disclosure relates to a method for determining a wheel alignment parameter in the form of a longitudinally extending centerline of the vehicle. The disclosure also relates to determining wheel alignment parameters defined in relation to the longitudinally extending centerline. Although the disclosure is mainly described in relation to a bus, it is applicable for other types of vehicles as well.

BACKGROUND

During vehicle manufacture and assembly, as well as maintenance, there is always a desire to make sure that the wheels are angled relative to each other and to the ground according to drawings and specification. If the wheels of the vehicle are angled differently and do not fulfil the given specification, the wheels may have to be adjusted. This adjustment is commonly referred to as wheel alignment. The purpose of the wheel alignment adjustment of the wheels is to reduce tire wear and to ensure that the vehicle travels straight when desired, as well as to optimize the way the vehicle behaves and responds when driving. The adjustments are, for example, commonly referred to as camber, caster, toe, parallelism, out of square, and king pin inclination, etc.

There are different approaches for determining if the wheels of the vehicle are in need of adjustment or not. Hence, different methods are available for determining if the wheel has been angled such that wheel alignment is necessary. One approach is to clamp a camera to each of the wheels of the vehicle. When determining the wheel angle, this is often made relative to a preset plane. Conventionally, the preset plane is often formed by means of a position on the vehicle frame.

However, there are vehicles that do not possess such vehicle frame to form a proper preset plane for use when determining wheel angles. A bus is a typical vehicle that does not contain such vehicle frame. There is thus a desire to provide a method for improved wheel alignment parameter determination.

SUMMARY

It is therefore an object of the present disclosure to provide a method for determining wheel alignment parameter of a vehicle which at least partially overcomes the above described deficiencies. This is achieved by a method according to claim 1.

According to a first aspect, there is provided a method for determining wheel alignment parameter of a vehicle comprising a vehicle body, wherein the vehicle body comprises a first and a second longitudinally extending side portion, the method comprising the steps of attaching a measuring arrangement to a first position at the first longitudinally extending side portion of the vehicle body; determining a lateral, longitudinal and vertical coordinate position of the first position at the first longitudinal side portion; attaching the measuring arrangement to a first position at the second longitudinally extending side portion of the vehicle body, the longitudinal and vertical coordinate positions of the first position at the second longitudinally extending side portion corresponding to the longitudinal and vertical coordinate positions of the first position at the first longitudinal side portion, respectively; determining a lateral coordinate position of the first position at the second longitudinal side portion; attaching the measuring arrangement to a second position at the first longitudinally extending side portion of the vehicle body; determining a lateral, longitudinal and vertical coordinate position of the second position at the first longitudinal side portion; attaching the measuring arrangement to a second position at the second longitudinally extending side portion of the vehicle body, the longitudinal and vertical coordinate positions of the second position at the second longitudinally extending side portion corresponding to the longitudinal and vertical coordinate positions of the second position at the first longitudinal side portion, respectively; determining a lateral coordinate position of the second position at the second longitudinal side portion; determining, using the lateral coordinate position of the first position at the first longitudinally extending side portion and the lateral coordinate position of the first position at the second longitudinal side portion, a first lateral center position of the vehicle; determining, using the lateral position of the second position at the first longitudinally extending side portion and the lateral position of the second position at the second longitudinal side portion, a second lateral center position of the vehicle; and determining a wheel alignment parameter in the form of a longitudinally extending centerline of the vehicle, the longitudinally extending centerline extending between the first lateral center position and the second lateral center position.

It should be readily understood that the above described steps of attaching the measuring arrangement to the vehicle body must not be performed in the above consecutive order. The measuring arrangement may, for example, firstly be connected to the first position at the first longitudinally extending side portion, thereafter to the second position at the first longitudinally extending side portion, or to the first position at the second longitudinally extending side portion, etc.

The wording "first and second longitudinally extending side portions" should be understood to relate to the sides of the vehicle, i.e. the vertical side surfaces at which e.g. the door and side windows are arranged.

Furthermore, the wording "corresponding to" should be construed as including geometric tolerances. The geometric tolerances may be different depending on the required measuring accuracy for the specific application, etc. Thus, the longitudinal and vertical coordinate positions of the first position at the second longitudinally extending side portion should be "substantially" the same as the longitudinal and vertical coordinate positions of the first position at the first longitudinal side portion, within acceptable geometric tolerances.

Moreover, the "measuring arrangement" should be construed as a device which is arranged to determine its current location. Hence, when attaching the measuring arrangement to one of the longitudinally extending side portions, the measuring arrangement should be able to determine its lateral, longitudinal and vertical coordinate positions relative e.g. a preset coordinate system. The measuring arrangement may, as will be described further below, be formed by an image capturing unit which is arranged to capture an image of an optical marker for determining its current location. Such image capturing unit may preferably comprise a gyro or accelerometer, etc. Other alternatives are also conceivable, such a suitable sensor arranged to determine lateral, longitudinal and vertical coordinate positions.

Furthermore, the wording "attaching" should not be construed in such a way that the measuring arrangement is fixated to the vehicle body. On the contrary, the measuring arrangement may be held onto the vehicle body by an operator. When the coordinate positions are determined, the operator simply removes the measuring arrangement from the vehicle body and holds it onto another portion of the vehicle body for a new measurement. The above method can also be performed autonomously by e.g. an industrial robot which attaches the measuring arrangement to the different portions of the vehicle body. Vehicle body should be construed as the plated outer surface enclosing the interior compartment of the vehicle.

An advantage is that a wheel alignment parameter in the form of a longitudinally extending centerline can be determined for a vehicle not comprising a vehicle frame. Hence, the above method is particularly suitable when measuring wheel angles for e.g. a bus that does not comprise a vehicle frame. Also, the accuracy of measurement is improved as there will be substantially no offset present between the measured centerline and the "real" centerline of the vehicle. Hereby, the consecutive wheel angle parameters can be measured and calculated relative the "real" longitudinally extending centerline of the vehicle. As such, when the wheel alignment is performed, a reduction of wear of the wheels will be achieved.

Furthermore, the method is simple to perform as an operator can simply attach the measuring arrangement to a first, more or less randomly selected position at the first longitudinally extending side portion of the vehicle body. When the coordinate positions for that position is determined, the operator can proceed to walk around the vehicle and select three further positions, whereby the longitudinally extending centerline of the vehicle can be subsequently determined.

Still further, as the first position at the second longitudinally extending side portion is selected at a vertical coordinate position corresponding to the vertical position of the first position at the first longitudinally extending side portion, any potential vehicle inclination can be detected.

According to an example embodiment, the method may further comprise the step of projecting the second lateral center position to a vertical position corresponding to the vertical coordinate position of the first lateral center position.

Hereby, the longitudinally extending centerline will be extending in a substantially horizontal plane. Moreover, also the first lateral center position can be projected to a desired vertical position, whereby the second lateral center position is projected to the same vertical position as the first lateral center position. When subsequently determining wheel alignment parameters in the form of wheel angles, also detected wheel coordinates of the wheel are preferably projected, i.e. moved, to be calculated at the same elevation as the vertical position of the first and second lateral center positions.

According to an example embodiment, the measuring arrangement may be attached to the second position at the first longitudinally extending side portion at a vertical coordinate position corresponding to the vertical coordinate position of the first position at the first longitudinal side portion.

Hereby, the second lateral center position can be determined at substantially the same elevation as the first lateral center position. The first and second lateral center positions can thereafter be projected to a desired position similar to the above description.

According to an example embodiment, the lateral, longitudinal and vertical coordinate position of the first position at the first longitudinally extending side portion may be determined by capturing an image, using the measuring arrangement, of an optical marker, the optical marker being positioned at a distance from the vehicle and comprises a predefined measuring pattern for determining a relative distance between the measuring arrangement and the optical marker.

The measuring pattern of the optical marker may be formed in a wide variety of patterns. Importantly is that the pattern is predefined and known such as to be able to determine a relative distance between the optical marker and the measuring arrangement. The measuring arrangement preferably comprises a gyro or accelerometer for determining an angle between the measuring arrangement and the optical marker.

According to an example embodiment, the measuring arrangement may comprise a support portion comprising three supporting elements arranged to attach to the vehicle body, and an image capturing unit connected to the support portion.

The support portion may thus be a so-called tripod. This will enable the operator to attach the measuring arrangement to the vehicle body, and maintain it stationary until the coordinate positions have been determined. Accordingly, a stable and robust arrangement is provided.

According to an example embodiment, the image capturing unit may be arranged to, when the measuring arrangement is attached to the vehicle body, capture a first image of a first optical marker positioned longitudinally forwardly of the measuring arrangement, and capture a second image of a second optical marker positioned longitudinally rearwardly of the measuring arrangement.

Capturing an image forwardly as well as rearwardly will improve the accuracy of measurement. The first and second images may be captured by e.g. a single image capturing unit which e.g. starts with capturing the first image and subsequently captures the second image. Hence, after capturing the first image, the image capturing unit is manually or automatically rotated to capture the second image. Other alternatives are also conceivable, such as e.g. a single bi-directional image capturing unit arranged to simultaneously capture an image forwardly as well as rearwardly. A further option is, as will be described below, to use a first and a second image capturing unit for capturing the first and second images, respectively.

According to an example embodiment, the image capturing unit may comprise a first camera arranged to capture the first image, and a second camera arranged to capture the second image.

As indicated above, the first and second images may be captured by two separate cameras or by a bidirectional camera arrangement comprising the first camera and the second camera.

According to an example embodiment, the coordinate positions of the first and second lateral center positions are defined relative a geometric plane for consecutive wheel angle measurements.

Hereby, a well defined plane for further calculations and measurements is provided.

According to an example embodiment, the step of attaching the measuring arrangement to the first position at the second longitudinally extending side portion may comprise the steps of attaching the measuring arrangement to the second longitudinally extending side portion; capturing an image, using the measuring arrangement, of an optical marker arranged at a distance from the vehicle, the optical marker comprising a predefined measuring pattern; determining a relative distance between the measuring arrangement and the optical marker; determining a current longitudinal and a current vertical coordinate position of the measuring arrangement at the second longitudinally extending side portion; comparing the current longitudinal and vertical coordinate positions with the longitudinal and vertical coordinate positions of the first position at the first longitudinal side portion; and moving the measuring arrangement to a position of the second longitudinally extending side portion having coordinate positions corresponding to the coordinate positions of the first position at the first longitudinal side portion.

Preferably, the measuring arrangement can be attached to any randomly selected position at the second longitudinally extending side portion of the vehicle. Thereafter, the measuring arrangement can be moved to the "correct" longitudinal and vertical coordinate positions, whereat the lateral coordinate position is determined. According to an example embodiment, the step of moving the measuring arrangement may be performed by using a guiding means for guiding the measuring arrangement to the first position at the second longitudinally extending side portion.

The guiding means may, for example, be a display positioned in the vicinity of the vehicle. Hereby, the operator can visually look at the display while at the same time moving the measuring arrangement to its correct position. The display will present information for visually guiding the operator. The guiding means may also be formed by an indicator arranged on the measuring arrangement. The indicator may be a small display or other means for presenting information to guide the operator to move the measuring arrangement to its correct longitudinal and vertical coordinate positions.

According to an example embodiment, the vehicle may further comprise a pair of front steerable wheels and a pair of rear wheels, and wherein a wheel measuring device may be connected to at least one of the wheels, the method further comprising the steps of determining, using the wheel measuring device connected to the at least one wheel, coordinate positions for the at least one wheel; and determining a wheel alignment parameter in the form of a wheel angle for the at least one wheel, the wheel angle being defined by the coordinate positions for the at least one wheel relative the longitudinally extending centerline of the vehicle.

The wheel measuring device may be one and the same unit as the measuring arrangement described above and as is attached to the vehicle body. Hereby, separate units do not need to be provided.

According to a second aspect, there is provided a system for determining wheel alignment parameter of a vehicle comprising a vehicle body, the system comprises a measuring arrangement and a control unit, wherein the control unit is configured to determine a lateral, longitudinal and vertical coordinate position of a first position at a first longitudinally extending side portion of the vehicle body by receiving a control signal from the measuring arrangement when the measuring arrangement is attached to the first longitudinally extending side portion; control the measuring arrangement to be attached to a first position at a second longitudinally extending side portion of the vehicle body, wherein the longitudinal and vertical coordinate positions of the first position at the second longitudinally extending side portion corresponds to the longitudinal and vertical coordinate positions of the first position at the first longitudinal side portion, respectively; determine a lateral coordinate position of the first position at the second longitudinal side portion; determine a lateral, longitudinal and vertical coordinate position of a second position at the first longitudinally extending side portion of the vehicle body by receiving a control signal from the measuring arrangement when the measuring arrangement is attached to the first longitudinally extending side portion; control the measuring arrangement to be attached to a second position at the second longitudinally extending side portion of the vehicle body, wherein the longitudinal and vertical coordinate positions of the second position at the second longitudinally extending side portion corresponds to the longitudinal and vertical coordinate positions of the second position at the first longitudinal side portion, respectively; determine a lateral coordinate position of the second position at the second longitudinal side portion; determine, using the lateral coordinate position of the first position at the first longitudinally extending side portion and the lateral coordinate position of the first position at the second longitudinal side portion, a first lateral center position of the vehicle; determine, using the lateral position of the second position at the first longitudinally extending side portion and the lateral position of the second position at the second longitudinal side portion, a second lateral center position of the vehicle; and determine a wheel alignment parameter in the form of a longitudinally extending centerline of the vehicle, the longitudinally extending centerline extending between the first lateral center position and the second lateral center position.

Effects and features of the second aspect are largely analogous to those described above in relation to the first aspect. Thus, any of the features described above in relation to the first aspect can be utilized and combined with the system defined by the second aspect.

An advantage is, as also described above, that the wheel angles will be defined in relation to the longitudinally extending centerline of the vehicle. As the centerline is the center portion of the vehicle, the wheel angles can be adjusted relative this centerline and not to offset relative the centerline, which would increase the wear of the wheels of the vehicle.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages of the present disclosure, will be better understood through the following illustrative and non-limiting detailed description of exemplary embodiments, wherein.

DETAILED DESCRIPTION

Figure 1:
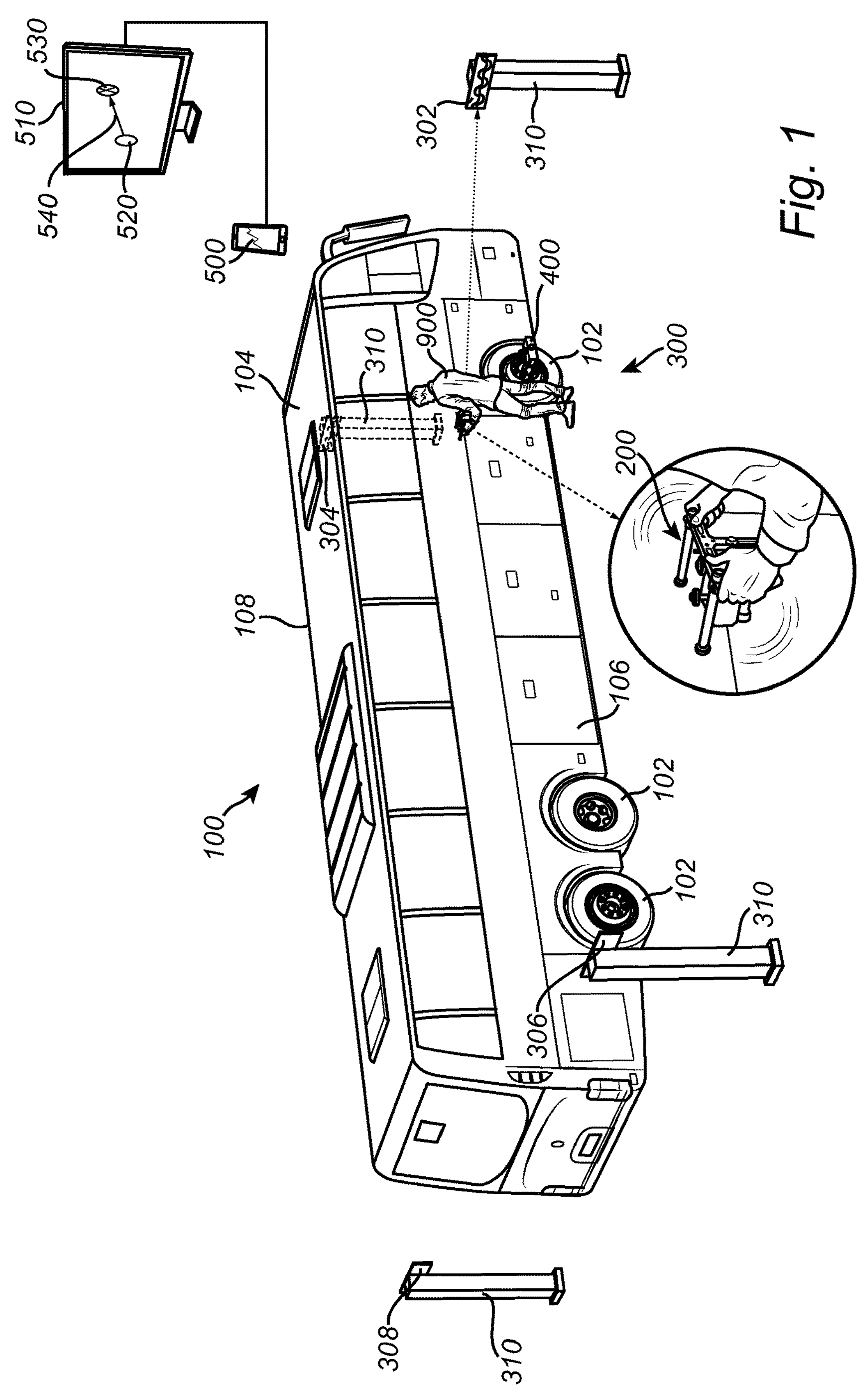
FIG. 1 is perspective view of a vehicle at which an example embodiment of a method for determining wheel alignment parameters is executed.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 100 in the form of a bus. In particular, the vehicle 100 in FIG. 1 does not comprise a conventional vehicle supporting frame. The vehicle 100 comprises a vehicle body 104, which in turn comprises a first 106 and a second 108 longitudinally extending side portion. As is depicted, the longitudinally extending side portions 106, 108 comprise vehicle side windows as well as doors to the luggage compartment arranged at a lower part of the vehicle 100. The vehicle 100 is positioned at a measurement station for performing wheel alignment measurements of the wheels 102 of the vehicle 100. When performing wheel alignment measurements, this should preferably be performed relative a well defined coordinate position so that "correct" measurements and consecutive wheel alignment can be performed, and so that the wheels 102 of the vehicle 100 are correctly aligned to reduce wear during operation. The following will now describe a system and a method for determining wheel alignment parameters of the vehicle 100. In particular, the following will mainly describe how to determine a wheel alignment parameter in the form of a longitudinally extending centerline of the vehicle 100 which will serve the purpose of acting as a reference for the consecutively performed wheel alignment measurements, i.e. when measuring the wheel angles of the wheels.

As can be seen in FIG. 1, there is provided a system 300 for determining wheel alignment parameters. The system 300 comprises a measuring arrangement 200 which is arranged to be attached to the surface of the longitudinally extending side portions of the vehicle 100. The measuring arrangement 200 will be described in further detail below in connection to the description of FIG. 4. The system 300 also comprises a plurality of optical markers 302, 304, 306, 308. Each of the optical markers 302, 304, 306, 308 is positioned on a pillar 310 arranged on the floor at the measurement station. The optical markers 302, 304, 306, 308 hereby form a predefined parallelogram in which the vehicle 100 is parked. Each optical marker 302, 304, 306, 308 also comprises a predefined measuring pattern, here illustrated in the form of a wave pattern having a predefined height and length. The measuring arrangement 200 is thus arranged to capture an image of at least one of the optical markers on the same side of the vehicle 100 in order to determine a current coordinate position of the measuring arrangement 200.

Furthermore, the system 300 comprises a control unit 500, illustrated as forming part of a computer or mobile device, and a display arrangement 510 connected to the control unit 500 and arranged to guide the operator to position the measuring arrangement 200 at a specific position on the vehicle body 104 as will be described further below. The display arrangement 510 is thus located at the measurement station such as to be visibly available for the operator. Reference numeral 520 illustrates the current location of the measuring arrangement 200 on the vehicle body 104, numeral 530 illustrates the desired position at which the measuring arrangement should be positioned, and numeral 540 illustrates a directional guide in the form of an arrow for guiding the operator to move the measuring arrangement 200 to the desired position. As also indicated in FIG. 1, the measuring arrangement 200 is arranged to wirelessly transmit control signals to the control unit 500. The measuring arrangement 200 may also be arranged to wirelessly receive control signals from the control unit 500. The measuring arrangement 200 may thus comprise a receiver and a transmitter (not shown).

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

As can be seen, the system 300 also comprises a wheel measuring device 400, which in FIG. 1 is connected to the front steerable wheel 102 on the right hand side of the vehicle 100. The wheel measuring device 400 can be of the same type as the measuring arrangement 200. The wheel measuring device 400 can even be one and the same measuring device as the measuring arrangement 200. Furthermore, the wheel measuring device 400 is arranged to capture an image of the optical marker for determining e.g. wheel angles of the respective wheels of the vehicle 100.

Figure 2:
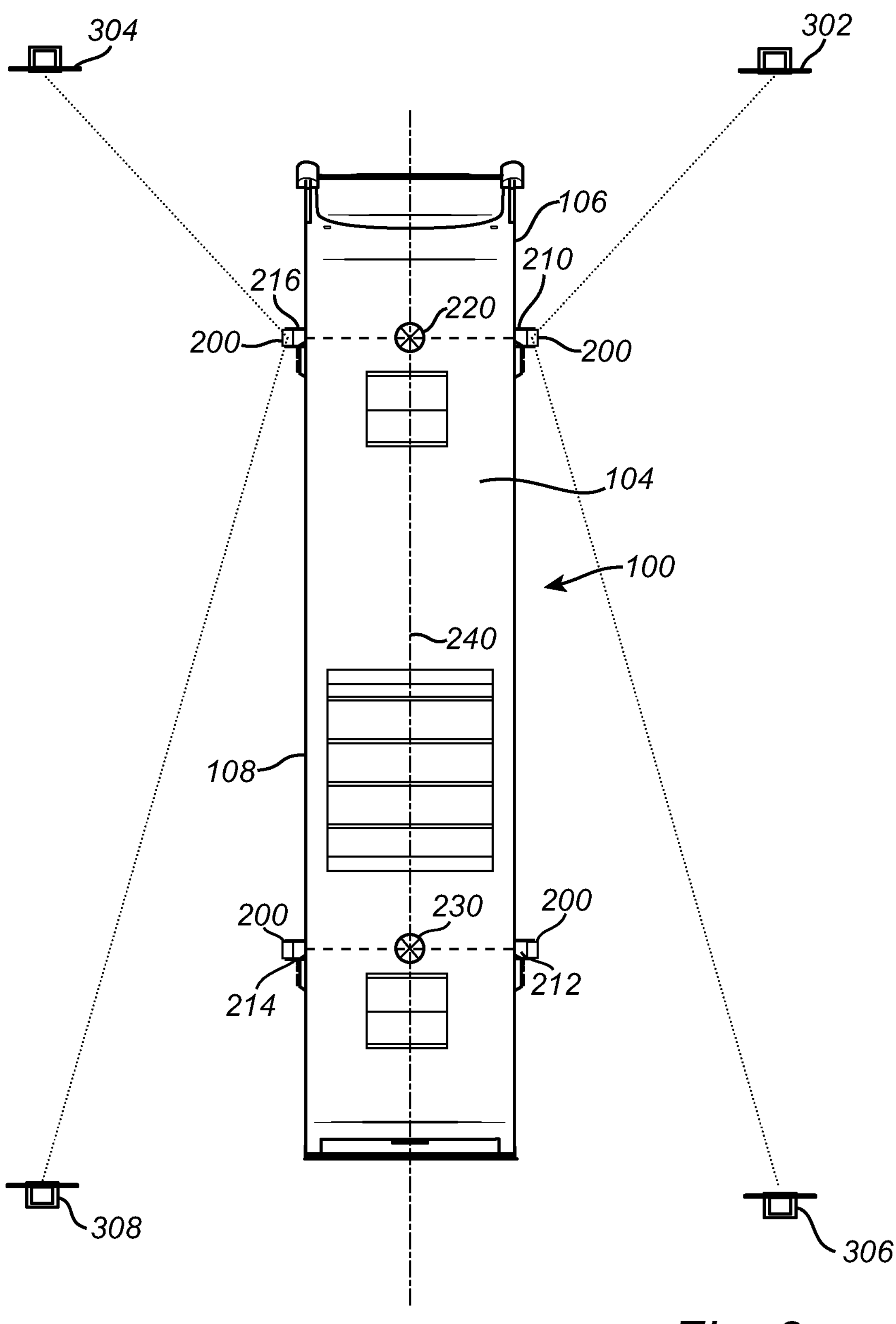
FIG. 2 is a top view of the vehicle in FIG. 1.
Figure 3:
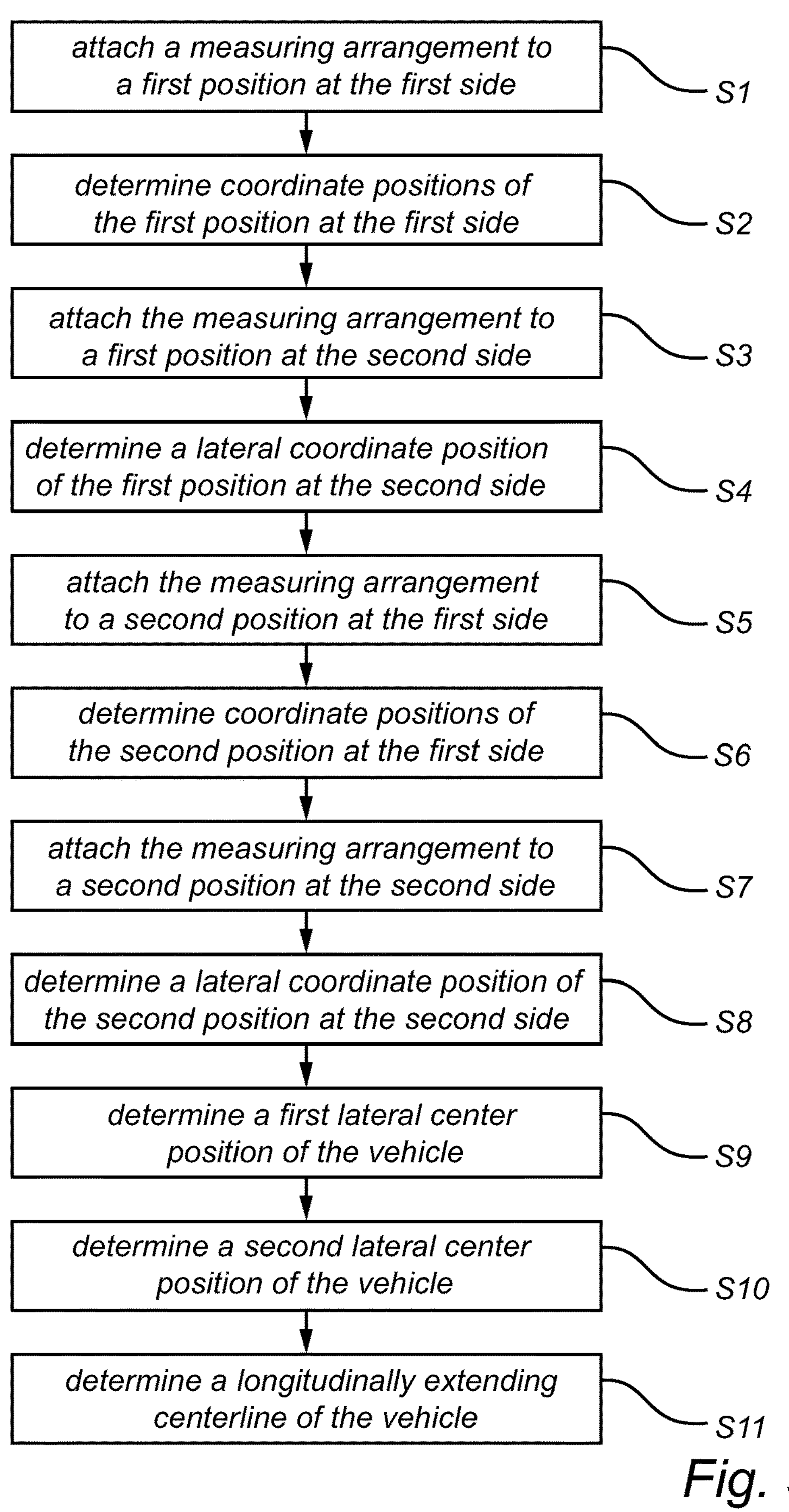
FIG. 3 is a flow chart of a method for determining wheel alignment parameter according to an example embodiment.

In order to describe the method for determining wheel alignment parameter in further detail, reference is made to FIGS. 2 and 3. FIG. 2 is a top view of the vehicle in FIG. 1 while FIG. 3 is a flow chart of a method for determining wheel alignment parameter according to an example embodiment. As described above, the vehicle 100 does not comprise a conventional vehicle supporting frame below the vehicle body 104. Another reference position for determining a wheel alignment parameter in the form of a longitudinally extending centerline is therefore needed.

When initiating the method, an operator 900 (see FIG. 1) or technician, attaches S1 the measuring arrangement 200 to a first position 210 at the first longitudinal side portion 106 of the vehicle 100, which first position 210 in FIG. 2 corresponds to the front right side of the vehicle body 104. The measuring arrangement 200 can also be attached to the first position 210 by using an industrial robot, or the like, although the following will describe the use of an operator for executing the method. The measuring arrangement 200 thereafter captures an image of one of the optical markers 302 arranged on the same side of the vehicle 100 as the first longitudinal side portion 106. Preferably, the measuring arrangement 200 captures a first image of the optical marker 302 in front of the vehicle, and a second image of the optical marker 306 positioned rearwardly of the vehicle 100. As the optical markers 302, 306 are arranged on a predefined position and comprises a predefined measuring pattern, the lateral, longitudinal and vertical coordinate positions of the first position 210 at the first longitudinal side portion 106 can be determined S2.

Thereafter, the operator moves to another portion of the vehicle body 104. In this case, the operator moves to a second position 212 at the first longitudinally extending side portion 106 of the vehicle body 104. The second position 212 in FIG. 2 corresponds to the rear right side of the vehicle body 104. The operator attaches S5 the measuring arrangement 200 to the second position 212 at the first longitudinally extending side portion 106. In a similar manner as for the first position 210, the lateral, longitudinal and vertical coordinate positions of the second position 212 at the first longitudinal side portion 106 is determined S6. Accordingly, the coordinate positions at the second position 212 are determined by using the measuring arrangement 200 to capture an image of the optical markers.

The operator continues around the vehicle 100 and thereafter attaches S7 the measuring arrangement 200 to a second position 214 at the second longitudinally extending side portion 108 of the vehicle body 104. The measuring arrangement 200 is attached to a position having substantially the same longitudinal and vertical coordinate positions as the longitudinal and vertical coordinate positions of the second position 212 at the first longitudinally extending side portion 106 of the vehicle body 104. The operator is preferably guided to the "correct" longitudinal and vertical positions by means of the display 510 depicted in FIG. 1. When the measuring arrangement 200 is at its correct position, the lateral coordinate position of the second position 214 at the second longitudinal side portion 108 is determined S8. In a similar manner as for the first 210 and second 212 positions of the first longitudinally extending side portion 106, the lateral, longitudinal and vertical coordinate positions of the second position 214 at the second longitudinal side portion 108 is determined by using the measuring arrangement 200 to capture an image of the optical markers 308, 310.

Finally, the operator moves on to the front left side of the vehicle 100. The operator attaches S3 the measuring arrangement to a first position 216 of the second longitudinally extending side portion 108 of the vehicle body 104. The second position 216 has substantially the same longitudinal and vertical coordinate positions as the longitudinal and vertical coordinate positions of the first position 210 at the first longitudinally extending side portion 106 of the vehicle body 104. In a similar manner as described above, the operator is preferably guided to attach the measuring arrangement at the desired coordinate positions. When the measuring arrangement 200 is at its correct position, the lateral coordinate position of the first position 216 at the second longitudinal side portion 108 is determined S4. In a similar manner as for the first 210 and second 212 positions of the first longitudinally extending side portion 106, the lateral, longitudinal and vertical coordinate positions of the first position 216 at the second longitudinal side portion 108 is determined by using the measuring arrangement 200 to capture an image of the optical markers 308, 310.

The operator has now retrieved vertical, longitudinal and lateral coordinate positions for each of the four positions around the vehicle 100. Hereby, a first and a second lateral center position of the vehicle 100 can be determined. In detail, the first lateral center position 220 is determined S9 by means of a mid point between the lateral coordinate position of the first position 210 at the first longitudinally extending side portion 106 and the lateral coordinate position of the first position 216 at the second longitudinally extending side portion 108. In a similar manner, the second lateral center position 230 is determined S10 by means of a mid point between the lateral coordinate position of the second position 212 at the first longitudinally extending side portion 106 and the lateral coordinate position of the second position 214 at the second longitudinally extending side portion 108.

Hereby, the longitudinally extending centerline 240 of the vehicle 100 can be determined S11 as a centerline extending between the first 220 and second 230 lateral center positions. The longitudinally extending centerline 240 can here serve a reference line for further wheel angle calculations using e.g. the wheel measuring device 400 depicted in FIG. 1. As an option, the wheel angles are preferably mathematically measured in the same geometric plane as the longitudinally extending centerline 240. The first 220 and second 230 lateral center positions are therefore preferably projected to be located at the same vertical coordinate position. As a non-limiting example, the first 220 and second 230 lateral center positions can be projected to a vertical coordinate position corresponding to the vertical coordinate position of the top end of the pillar 310 onto which the optical markers are attached. The measurements made for the wheel angles are thus also projected to this geometric plane.

Figure 4:
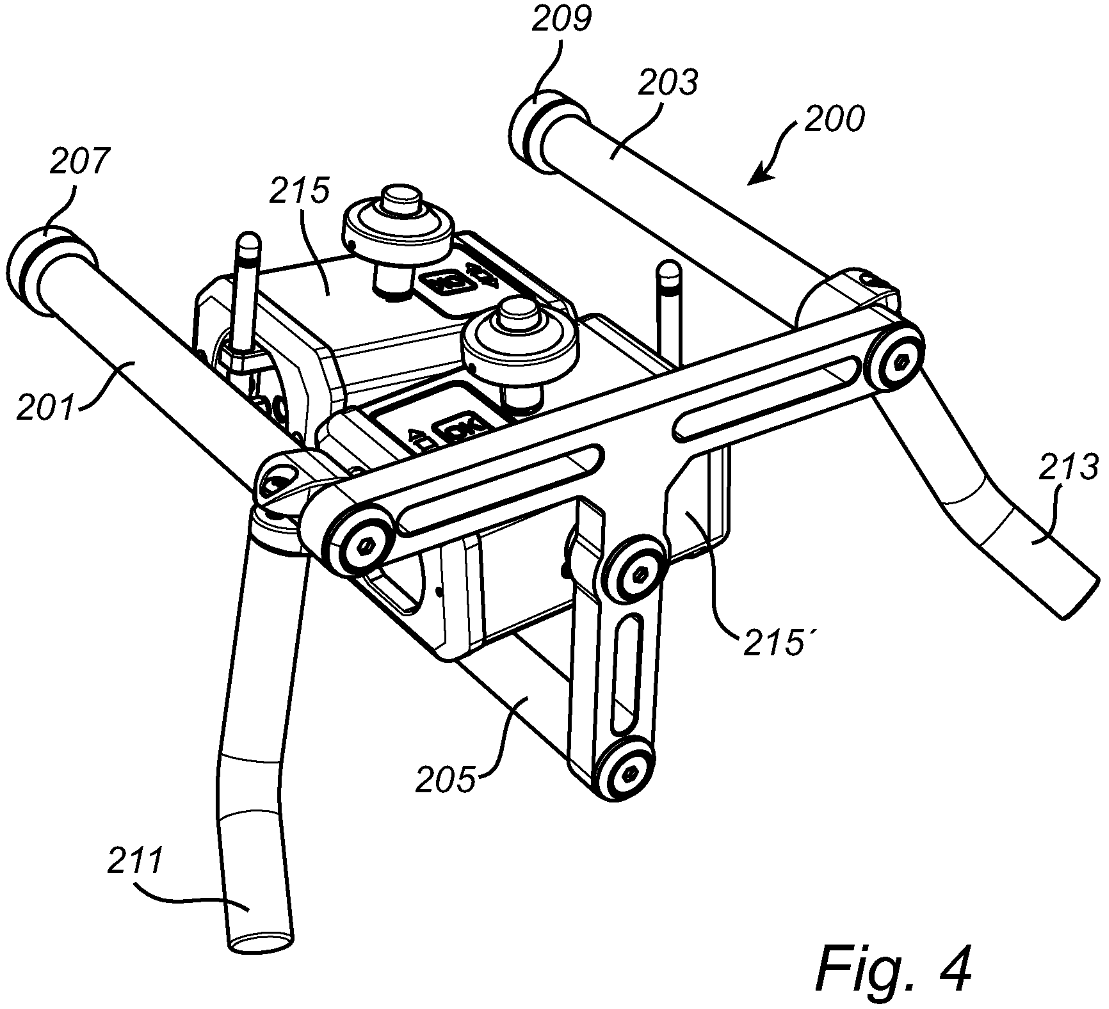
FIG. 4 is a perspective view of a measuring arrangement according to an example embodiment.

In order to describe the measuring arrangement 200 in further detail, reference is made to FIG. 4 which illustrates the measuring arrangement 200 according to an example embodiment. The measuring arrangement 200 is arranged as a tripod with three supporting elements 201, 203, 205. Each supporting element is arranged in the form of a support leg and is provided with a foot portion 207, 209 for attachment to the surface of the vehicle body 104. The measuring arrangement 200 further comprises a pair of handles 211, 213 at which the operator holds the measuring arrangement 200 against the surface of the vehicle body 104.

Moreover, the measuring arrangement 200 comprises an image capturing unit 215, 215'. In FIG. 4, the image capturing unit 215, 215' is arranged as a first 215 and a second 215' camera. The first camera 215 is preferably arranged to capture an image of the optical marker in front of the vehicle 100, while the second camera 215' is arranged to capture an image of the optical marker rearwardly of the vehicle 100. Although not depicted in FIG. 4, the image capturing unit may be a unidirectional camera arranged to simultaneously capture the forward and rearward images. As a further alternative, the measuring arrangement 200 may comprise a single camera which is rotatably connected to the tripod, where a first image is capture forwardly of the vehicle, where after a second image is captured rearwardly of the vehicle after moving the camera 180 degrees.

Furthermore, the image capturing unit preferably comprises a gyro or accelerometer for determining its angle as defined by a global coordinate system.

It is to be understood that the present disclosure is not limited to the embodiment described above and illustrated in the drawings; rather, the skilled person will recognize that many changes and modifications may be made within the scope of the appended claims.

The invention claimed is:

1. A method for determining wheel alignment parameter of a vehicle comprising a vehicle body, wherein the vehicle body comprises a first and a second longitudinally extending side portion, the method comprising the steps of:

attaching a measuring arrangement to a first position at the first longitudinally extending side portion of the vehicle body;

determining a lateral, longitudinal and vertical coordinate position of the first position at the first longitudinal side portion;

attaching the measuring arrangement to a first position at the second longitudinally extending side portion of the vehicle body, the longitudinal and vertical coordinate positions of the first position at the second longitudinally extending side portion corresponding to the longitudinal and vertical coordinate positions of the first position at the first longitudinal side portion, respectively;

determining a lateral coordinate position of the first position at the second longitudinal side portion;

attaching the measuring arrangement to a second position at the first longitudinally extending side portion of the vehicle body;

determining a lateral, longitudinal and vertical coordinate position of the second position at the first longitudinal side portion;

attaching the measuring arrangement to a second position at the second longitudinally extending side portion of the vehicle body, the longitudinal and vertical coordinate positions of the second position at the second longitudinally extending side portion corresponding to the longitudinal and vertical coordinate positions of the second position at the first longitudinal side portion, respectively;

determining a lateral coordinate position of the second position at the second longitudinal side portion;

determining, using the lateral coordinate position of the first position at the first longitudinally extending side portion and the lateral coordinate position of the first position at the second longitudinal side portion, a first lateral center position of the vehicle;

determining, using the lateral position of the second position at the first longitudinally extending side portion and the lateral position of the second position at the second longitudinal side portion, a second lateral center position of the vehicle; and determining a wheel alignment parameter in the form of a longitudinally extending centerline of the vehicle, the longitudinally extending centerline extending between the first lateral center position and the second lateral center position.

2. The method according to claim 1, further comprising the step of:

projecting the second lateral center position to a vertical position corresponding to the vertical coordinate position of the first lateral center position.

3. The method according to claim 1, wherein the measuring arrangement is attached to the second position at the first longitudinally extending side portion at a vertical coordinate position corresponding to the vertical coordinate position of the first position at the first longitudinal side portion.

4. The method according to claim 1, wherein the lateral, longitudinal and vertical coordinate position of the first position at the first longitudinally extending side portion is determined by capturing an image, using the measuring arrangement, of an optical marker, the optical marker being positioned at a distance from the vehicle and comprises a predefined measuring pattern for determining a relative distance between the measuring arrangement and the optical marker.

5. The method according to claim 1, wherein the measuring arrangement comprises a support portion comprising three supporting elements arranged to attach to the vehicle body, and an image capturing unit connected to the support portion.

6. The method according to claim 5, wherein the image capturing unit is arranged to, when the measuring arrangement is attached to the vehicle body, capture a first image of a first optical marker positioned longitudinally forwardly of the measuring arrangement, and capture a second image of a second optical marker positioned longitudinally rearwardly of the measuring arrangement.

7. The method according to claim 6, wherein the image capturing unit comprises a first camera arranged to capture the first image, and a second camera arranged to capture the second image.

8. The method according to claim 1, wherein the coordinate positions of the first and second lateral center positions are defined relative a geometric plane for consecutive wheel angle measurements.

9. The method according to claim 1, wherein the step of attaching the measuring arrangement to the first position at the second longitudinally extending side portion comprises the steps of:

attaching the measuring arrangement to the second longitudinally extending side portion;

capturing an image, using the measuring arrangement, of an optical marker arranged at a distance from the vehicle, the optical marker comprising a predefined measuring pattern;

determining a relative distance between the measuring arrangement and the optical marker;

determining a current longitudinal and a current vertical coordinate position of the measuring arrangement at the second longitudinally extending side portion;

comparing the current longitudinal and vertical coordinate positions with the longitudinal and vertical coordinate positions of the first position at the first longitudinal side portion; and moving the measuring arrangement to a position of the second longitudinally extending side portion having coordinate positions corresponding to the coordinate positions of the first position at the first longitudinal side portion.

10. The method according to claim 9, wherein the step of moving the measuring device is performed by using a guiding means for guiding the measuring arrangement to the first position at the second longitudinally extending side portion.

11. The method according to claim 1, wherein the vehicle further comprises a pair of front steerable wheels and a pair of rear wheels, and wherein a wheel measuring device is connected to at least one of the wheels, the method further comprising the steps of:

determining, using the wheel measuring device connected to the at least one wheel, coordinate positions for the at least one wheel; and determining a wheel alignment parameter in the form of a wheel angle for the at least one wheel, the wheel angle being defined by the coordinate positions for the at least one wheel relative the longitudinally extending centerline of the vehicle.

12. A system for determining wheel alignment parameter of a vehicle comprising a vehicle body, the system comprises a measuring arrangement and a control unit, wherein the control unit is configured to:

determine a lateral, longitudinal and vertical coordinate position of a first position at a first longitudinally extending side portion of the vehicle body by receiving a control signal from the measuring arrangement when the measuring arrangement is attached to the first longitudinally extending side portion;

control the measuring arrangement to be attached to a first position at a second longitudinally extending side portion of the vehicle body, wherein the longitudinal and vertical coordinate positions of the first position at the second longitudinally extending side portion corresponds to the longitudinal and vertical coordinate positions of the first position at the first longitudinal side portion, respectively;

determine a lateral coordinate position of the first position at the second longitudinal side portion;

determine a lateral, longitudinal and vertical coordinate position of a second position at the first longitudinally extending side portion of the vehicle body by receiving a control signal from the measuring arrangement when the measuring arrangement is attached to the first longitudinally extending side portion;

control the measuring arrangement to be attached to a second position at the second longitudinally extending side portion of the vehicle body, wherein the longitudinal and vertical coordinate positions of the second position at the second longitudinally extending side portion corresponds to the longitudinal and vertical coordinate positions of the second position at the first longitudinal side portion, respectively;

determine a lateral coordinate position of the second position at the second longitudinal side portion;

determine, using the lateral coordinate position of the first position at the first longitudinally extending side portion and the lateral coordinate position of the first position at the second longitudinal side portion, a first lateral center position of the vehicle;

determine, using the lateral position of the second position at the first longitudinally extending side portion and the lateral position of the second position at the second longitudinal side portion, a second lateral center position of the vehicle; and determine a wheel alignment parameter in the form of a longitudinally extending centerline of the vehicle, the longitudinally extending centerline extending between the first lateral center position and the second lateral center position.

* * * * *